United States Patent Office 3,518,237
Patented June 30, 1970

3,518,237
ETHYLENE COPOLYMERISATION CATALYST
Edward William Duck, Southampton, and David Page Grieve, Holbury, England, assignors to The International Synthetic Rubber Company Limited, Southampton, England, a corporation of the United Kingdom
No Drawing. Continuation-in-part of application Ser. No. 558,242, June 17, 1966. This application Oct. 9, 1967, Ser. No. 673,916
Int. Cl. C08f *15/40*
U.S. Cl. 260—80.78    15 Claims

ABSTRACT OF THE DISCLOSURE

A catalyst system which is effective in homo- and co-polymerizing α-olefins comprises:
(a) An organic compound comprising vanadium, titanium or zirconium not containing a halogen directly attached to the metal atom,
(b) an aluminium trihalide or an aluminium dihalohydride and
(c) an alkyl, aryl or alkylaryl organo-metallic compound of lithium.
The catalyst may also be used to prepare terpolymers of α-olefins in which the third monomer is a second α-olefin or a non-conjugated diolefin.

---

This application is a continuation-in-part of application No. 558,242, filed June 17, 1966, now abandoned, and is concerned with the homopolymerization of α-olefins and copolymerization of an α-olefin with another α-olefin, and, optionally, not more than 10% of a third monomer in the presence of a three-component catalyst system.

According to the present invention at least one α-olefin is polymerised in the presence of a catalyst system comprising: (a) an organic compound of vanadium, titanium or zirconium not containing a halogen directly attached to the metal atom, (b) an aluminium trihalide or an aluminium dihalohydride and (c) an alkyl, aryl or alkylaryl organo-metallic compound of lithium, the lithium component (c) only being brought into contact with the aluminium component (b) when the vanadium, titanium or zirconium component (a) or at least one hydrocarbon monomer is also present.

All three components in this catalyst combination are necessary and no two components will homopolymerise or copolymerise α-olefins with other unsaturated compounds in the absence of the third component, to any significant extent.

Order of addition of the catalyst components has a marked effect on the efficiency of the catalyst combination. By far the best results are obtained by the premixing of the aluminium halide (b) with the vanadium, titanium or zirconium compound (a) in the presence of the monomer(s) before adding the organo-metallic lithium compound (c).

Premixing the organo-lithium component (c), e.g. lithium alkyl, with the aluminium halide (b) has an adverse effect on catalytic activity. The indications from this are that the in situ formation of aluminium alkyl halides or lithium aluminium alkyl salts from the reaction of lithium alkyl+aluminium halide does not form the basis of the mechanism of our catalytic system. Furthermore, the combination of lithium alkyl with vanadium, titanium or zirconium compound in the absence of the aluminium halide gives no polymerisation at all.

Suitable vanadium compounds include vanadyl diisopropyl salicylate (VO dips), tri-n-butyl vanadate, vanadyl acetyl acetonate and tri-ethyl vanadate. Suitable titanium and zirconium compounds are titanium butoxide and zirconium butoxide. Examples of aluminium compounds which may be used include aluminium tri-iodide, aluminium tri-bromide and aluminium dibromohydride. Phenyl lithium benzyl lithium and n-butyl lithium are examples of suitable organo-metallic lithium compounds.

The relative amounts of components (a), (b) and (c) employed are preferably such that the molecular ratio of the component (c) to component (a) is in the range 8–50:1 and the ratio of (b) to (c) is within the range 0.25–5:1.

The catalyst system described above is effective in homopolymerising α-olefins and in copolymerising ethylene with a second α-olefin and, optionally, up to 10% of a third monomer.

The α-olefins which can be homopolymerised using this catalyst system include ethylene, propylene, butene-1, isobutene, heptene-1, 4-methyl pentene-1, 2-methyl pentene-1 and 2,4,4-trimethyl pentene-1.

Examples of the α-olefin with which ethylene is copolymerised by the process of the present invention are propylene, butene-1 and 4-methyl butene-1. All proportions of ethylene and α-olefin can be copolymerised using the catalyst system of the present invention. Rubbers having particularly desirable properties are obtained by co-polymerising 60 moles percent ethylene and 40 moles percent propylene.

As well as being effective in the copolymerisation of two monomers, the catalyst system of the present invention may also be used to prepare terpolymers in which there is present a minor amount of a third monomer. The termonomer may either be a second olefin such as propylene, butene-1 or 4-methyl pentene-1, or a non-conjugated diolefin such as dicyclopentadiene, cyclo-octadiene or hexadiene-1,4, or trivinyl cyclohexane. The amount of termonomer, where present, should not exceed 10% molar. The addition of a minor amount of a termonomer leads to a marked improvement in the vulcanisation properties of the copolymer of ethylene with an α-olefin and enables the polymer product to be vulcanised with the usual sulphur-containing recipes. Thus, ethylene-propylene copolymers, in the absence of a third monomer, cannot be vulcanised by the conventional route but only by using, for example, a peroxide system. It is obviously of great advantage to be able to use the same vulcanisation process for ethylene copolymers as other synthetic rubbers e.g. SBR dienes. The minimum amount of ter-monomer required to ensure that the product will vulcanise satisfactorily using conventional recipes is 2–3 moles percent.

The polymerisation process is carried out within the temperature range −30° C. to +150° C. and the preferred polymerisation temperature is between −10° and +60° C.

Polymerisation is preferably carried out in the presence of an anhydrous hydrocarbon solvent.

The choice of solvent system for the copolymerisation and terpolymerisation has been found to have a marked effect on the viscosity of the reaction medium. It is evidently advantageous to use a solvent which gives lowest bulk viscosity for a given polymer concentration since more polymer can be handled in a reactor of a given size and less solvent has to be recycles. Using a straight chain paraffin alone, the products of the polymerisation may contain a small proportion of insoluble material. This insoluble fraction is largely a block copolymer of ethylene and propylene which does not possess the required rubbery properties. When a cycloparaffin is used, a completely soluble random co (or ter-) polymer having excellent rubbery properties is obtained. However, the viscosities of the solutions of polymer produced in pure cyclo-paraffins are very high. This leads to serious problems in handling such a system on a large scale. By using a mixture of a straight chain paraffin and a cyclo-paraffn it is possible to retain a 100% soluble product at a gravity reduced viscosity.

EXAMPLE 1

Vanadyl diisopropyl salicylate (VO dips) and aluminium triiodide were dissolved together under a $N_2$ blanket in 400 ml. anhydrous hexane saturated with ethylene and propylene at 0° C. such that the concentrations were 1 millimole/litre and 10 millimole per litre of VO-dips and $AlI_3$ respectively. On adding the $AlI_3$ to the solution of VO dips the characteristic dark blue colour of the VO dips changed to a greenish-grey, indicating that a reaction between these components had occurred. No polymer formed at this stage. Ethylene and propylene monomers were passed through the reaction solution which was maintained at 0° C. and then a solution of lithium n-butyl in hexane was slowly added to the reaction mixture until the total concentration of the lithium n-butyl in the reaction mixture was 15 millimoles per litre. A further change in colour occurred giving a grey, somewhat turbid appearance and polymerisation started immediately. The reaction mixture was maintained at 0° C. by cooling and ethylene/propylene monomers were passed into the latter at a ratio of 270 cc. per minute of ethylene to 450 cc. per minute of propylene for 30 mins. After this period the reaction was stopped by the addition of a small amount of methanol-HCl and the reactor contents poured into acetone. Ethylene-propylene copolymer precipitated immediately. On washing and drying 12.5 gm. of a rubbery copolymer containing 50 molar percent propylene was recovered. The I.V. of this material in decalin at 130° C. was 3.1.

EXAMPLE 2

The procedure described in Example 1 was followed but instead of aluminium iodide, freshly purified $AlBr_3$ was used. In this case 11.7 gm. of an ethylene-propylene rubbery copolymer of I.V. 2.9 and 44% propylene content was obtained.

EXAMPLE 3

The procedure described in Examples 1 and 2 was followed except that the aluminium halide component was omitted completely. No polymer at all was obtainable from this reaction.

EXAMPLE 4

The general procedure and concentrations employed in Example 1 were used except that the lithium n-butyl and aluminium triiodide were mixed together first in the presence of the monomers, and the vanadyl diisopropyl salicylate added as the last component after ten minutes. The reaction mixture prior to the addition of the VO dips was white suspension—no polymerisation occurred. After addition of the VO dips the reaction mixture became a dark straw colour and there was some indication that a small amount of insoluble polymer was forming around the precipitate previously observed. After 30 minutes the contents were treated as in Example 1. 0.5 g. of a white non-rubbery polymer resulted. The propylene content of this material as indicated from its I.R. structure was 22% and its I.V. 1.9.

EXAMPLE 5

Tri-n-butyl vanadate (0.25 mmole) was dissolved in a solvent consisting of 495 ml. pure dry cyclohexane in a atmosphere of anhydrous nitrogen. The solution was saturated at atmospheric pressure with a mixture of ethylene and propylene such that the gaseous feed contained 40 moles percent propylene. This feed was continued at the rate of 700 ml. min.$^{-1}$ for the rest of the reaction. The solution was stirred rapidly and cooled to 0°±2° and aluminium bromide (5 mmole) was introduced. The pale yellow solution became purple. The components were mixed for approximately 15 minutes. No polymer was formed and the colour slowly faded to a dark yellow. Dicyclopentadiene (0.8 g.) was introduced followed by lithium n-butyl (7.5 mmole).

Immediately following addition of the lithium n-butyl, the solution became a turbid white and polymerisation commenced. After 1½ hr. the solution was very viscous but the polymer was completely soluble. The terpolymer was isolated by injection of methanol. The yield was 20 g. of a polymer containing 40 moles percent propylene. An excellent vulcanisation of the product when treated in the usual way with sulphur containing compounds etc., proved that the dicyclopentadiene has been incorporated. Presence of the third monomer was also shown by infrared spectroscopy and iodine number. The intrinsic viscosity of the product as a 0.1% solution in Decalin at 130° was 1.5. The viscosity of the solution after polymerisation was 18,000 cp.

EXAMPLE 6

The same procedure was followed as in Example 5 except that the solvent employed was n-hexane (495 ml.). The colour changes were as in Example 5. A product (20 g.) was produced which was approximately 50% in soluble in the polymerising solution. The polymer was easily vulcanised and thus contained appreciable amounts of dicyclopentadiene. The I.V. was 1.5 (Decalin) and infra-red spectroscopy showed that the polymer contained 40 moles percent propylene.

EXAMPLE 7

The procedure described in Example 5 was followed except that the aluminium bromide was omitted completely. No polymer was obtained from this reaction.

EXAMPLE 8

The procedure described in Example 5 was used except that the solvent consisted of 248 ml. cyclohexane and 248 ml. n-hexane. The product (25 g. 40 moles percent propylene) was completely soluble in the reaction medium and the final solution had a considerably reduced viscosity (3,500 cp.) compared to the similar product from Example 5 (18,000 cp.). A good tight cure was obtained with the usual vulcanising ingredients. The I.V. (Decalin) was 2.0.

EXAMPLE 9

Tri n-butyl vanadate (1.5 mmole) was dissolved in a solvent consisting of cyclohexane (2.25 l.) and n-hexane (0.75 l.). The solution was saturated with a mixture of ethylene and propylene containing 50 moles percent propylene at the rate of 3.1 min.$^{-1}$. The experimental procedure of Example 5 was followed with 30 mmoles aluminium bromide, 45 mmoles n-butyl lithium and 4.8 g. dicyclopentadiene.

The reaction was stopped after 1 hr. by addition of methanol. The soluble product amounted to 80 g., and contained 40 moles percent propylene and had an intrinsic viscosity (measured as a 0.1% solution in cyclohexane at 30°) of 3.0. The viscosity of the final solution (3.5% solids) before coagulation was 1400 cp. The product vulcanised readily with the normal sulphur-accelerator system.

EXAMPLE 10

The procedure of Example 5 was followed with a solvent consisting of 125 ml. cyclohexane and 375 ml., n-hexane. The product (14 g.) was readily vulcanised but was only 14% soluble in the reaction medium. The physical analysis of the gross polymer gave propylene 30 moles percent and I.V. of the soluble portion in cyclohexane was 5.

EXAMPLE 11

The procedure of example 9 was followed except that 9.6 g. of dicyclopentadiene was used. The yield was 70 g.

of completely soluble product containing 40 moles percent propylene with an I.V. (cyclohexane) of 2.8. It vulcanised readily.

EXAMPLE 12

The procedure of Example 9 was followed except that the solvent used was 2.25 l. cyclohexane and 0.75 l. isooctane. The product (75 g.) was similar in properties to that from Example 10.

EXAMPLE 13

The general procedure of Example 9 was followed except that 10 g. n-dodecene was added to the solution just before addition of dicyclopentadiene. The product 80 g. was largely, but not completely soluble and contained 25 moles percent propylene. The unvulcanised product showed a high degree of tackiness. I.V. (cyclohexane) 4.0. The product was readily vulcanisable.

EXAMPLE 14

The general procedure of Example 9 was followed except that the gaseous feed consisted of 30 moles percent ethylene and 70 moles percent butene-1. The yield was 50 g. containing approximately 40 moles percent butene-1 with an I.V. (cyclohexane) of 4. It was readily vulcanised.

EXAMPLE 15

The general procedure of Example 9 was followed except that the termonomer used was 12 g. cyclooctadiene—1.5. The yield was 70 g. containing 40 moles percent propylene, I.V.=3 (cyclohexane). It was vulcanisable.

EXAMPLE 16

The general procedure of Example 9 was followed except that 12 g. hexadiene—1.4 was the termonomer. The yield was 90 g., containing 40 moles percent propylene. I.V. (cyclohexane) 2. It was vulcanisable.

EXAMPLE 17

The procedure of Example 9 was used except that phenyl lithium was used as the organo metallic component instead of n-butyl lithium. The yield was 70 g. (containing 40 moles percent propylene) and had I.V. (cyclohexane) of 3.5; it was readily vulcanised.

EXAMPLE 18

The procedure of Example 9 was followed except that vanadyl acetyl acetonate was used in place of tri-n-butyl vanadate. The yield was 60 g. (40 moles percent propylene) and had I.V. (cyclohexane) of 5. It was readily vulcanisable.

EXAMPLE 19

The procedure of Example 9 was followed except that tri-ethyl vanadate was used in place of tri-n-butyl vanadate. The yield was 65 g. (containing 35 moles percent propylene) and had I.V. (cyclohexane) of 2. It was readily vulcanisable.

EXAMPLE 20

The procedure of Example 9 was followed except that aluminium dibromo hydride was used instead of aluminium bromide. The yield was 90 g. (containing 45 moles percent propylene) and had I.V. (cyclohexane) of 1.5. It was readily vulcanisable.

EXAMPLE 21

The same procedure was followed as in Example 5 except that the solution was saturated with ethylene alone and 10 g. of 4-methyl pentene-1 was added gradually as a 10% solution in cyclohexane over the whole polymerisation period. This produced 20 g. of a rubbery copolymer containing 40 moles percent 4-methyl pentene-1 with an I.V. (cyclohexane) of 3.

EXAMPLE 22

The same procedure was followed as in Example 9 except that the solution was saturated with ethylene alone and 30 g. 4-methyl pentene-1 were added gradually as a 10% solution in cyclohexane over the whole polymerisation period. The yield was 80 g. containing approximately 30 moles percent 4-methyl pentene-1 with an I.V. (cyclohexane) of 3.2. It was readily vulcanisable.

EXAMPLE 23

Titanium butoxide ($Ti(BuO)_4$) and aluminium tribromide were dissolved together under a nitrogen blanket in 400 ml. anhydrous cyclohexane saturated with ethylene and propylene at 0° C. such that the concentrations were 0.5 millimole/litre and 10 millimoles/litre of $Ti(BuO)_4$ and $AlBr_3$ respectively. On adding the $AlBr_3$ to the solution of $Ti(BuO)_4$ a characteristic orange colour appeared indicating that a reaction between these components had occurred. No polymer formed at this stage. Ethylene and propylene monomers were passed through the reaction solution which was maintained at 0–5° C. and then a solution of lithium butyl in hexane was added to give a concentration of 15 millimoles per litre. A further change in colour occurred; the solution assumed a grey/white slightly turbid appearance and polymerisation started immediately. The reaction mixture was maintained at 0–5° C. by cooling and ethylene/propylene monomers were passed through at rates of 400 cc. per minute of ethylene to 400 cc. per minute of propylene for 1 hour. After this period the reaction was stopped by the addition of methanol and the reactor contents were poured into acetone to precipitate the ethylene-propylene copolymer. On washing and drying 8 gms. of a rubbery copolymer containing 40 mole percent propylene was recovered. The I.V. of this material in benzene at 25° was 7.1.

EXAMPLE 24

The procedure described in Example 23 was followed but instead of titanium butoxide, pure zirconium butoxide, $Zr(BuO)_4$ was used. In this case 5 gms. of soluble ethylene-propylene rubbery copolymer of I.V. 5 and 32% propylene content was obtained.

EXAMPLE 25

The procedure described in Examples 23 and 24 was followed except that the aluminium halide component was omitted completely. No polymer was obtained from this reaction.

EXAMPLE 26

The general procedure and concentrations employed in Example 23 were used except that the lithium butyl and aluminium tribromide were mixed together first in the presence of the monomers and titanium butoxide added as the last component after 10 minutes. The reaction mixture prior to the addition of the titanium butoxide contained a white suspension; no polymerisation occurred. After addition of titanium butoxide the reaction mixture assumed a grey/brown colour and some polymer formed around the precipitate previously observed. After 30 minutes the contents were treated as in Example 1, 0.5 gm. of a white polymer resulted. The propylene content of this material as indicated from its I.R. structure was 20% and its I.V. 9.0.

EXAMPLE 27

The procedure in Example 23 was followed except that the concentrations of titanium butoxide, aluminium-tribromide and lithium butyl were 1 millimole per litre, 5 millimoles per litre and 10 millimoles per litre respectively. In this instance 6 gms. of soluble ethylene-propylene copolymer of I.V. 6.5 containing 50 moles percent propylene was recovered.

EXAMPLE 28

The procedure in Example 23 was followed with the addition that dicyclopentadiene dissolved in cyclohexane was added dropwise throughout the polymerisation period of 1 hour to give a concentration of 20 millimoles per litre of solution. In this instance 4 gms. of a solution ethylene-propylene-dicyclopentadiene terpolymer of I.V. 5.3 containing 45 moles percent propylene was recovered. This material could be vulcanized with sulphur.

EXAMPLE 29

500 ml. pure, dry normal hexane was added to a 700 ml. flange flask of the polymerisation type under an anhydrous and highly purified nitrogen atmosphere. The solution was saturated at atmospheric pressure and 0° C. with pure, dry ethylene (1000 ml. min.$^{-1}$) by bubbling the gas through the solution for one hour with high speed stirring (980 r.p.m.).

The catalyst solutions were injected in rapid succession as dilute solutions in cyclohexane in the following order: vanadyl tri n-butoxide (0.24 mmole), aluminium bromide (5 mmole), lithium butyl (7.5 mmole). Thus V:Al:Li=1:20:30 molar Ethylene was bubbled through the reacting solution for one hour and the temperature was held at 0° C. The monomer polymerised to a white, insoluble powdery polyethylene of very high molecular weight.

The yield was 52 g. The Intrinsic Viscosity (I.V., measured as a 0.1% w./v. solution in Decalin at 135° C.) was 10.9.

EXAMPLES 30–37

The same procedure was used as in Example 29 with the differences noted in the table. In the case of the liquid monomers heptene-1 and 4-methyl pentene-1, 20 g. monomer were injected before polymerisation and there was no saturation period.

| Example Number | Monomer | VO(OⁿBu)₃ concn. mmole/ 500 ml. | V:Al:Li | Yield, g./500 ml./hr. | I.V. | Comments |
|---|---|---|---|---|---|---|
| 30 | Ethylene | 0.125 | 1:20:30 | 45 | 10.5 | Insoluble white powder. |
| 31 | do | 0.0625 | 1:20:30 | 38 | 12 | Do. |
| 32 | do | 0.125 | 1:10:10 | 40 | 9.9 | Do. |
| 33 | Propylene | 0.25 | 1:20:30 | 9.5 | 12.8 | Soluble atactic. |
| 34 | do | 0.125 | 1:10:10 | 6.0 | 11.0 | Do. |
| 35 | Butene-1 | 0.25 | 1:20:30 | 2.0 | 8.5 | Do. |
| 36 | Heptene-1 | 0.25 | 1:20:30 | 4.0 | 9.6 | Do. |
| 37 | 4-methyl pentene-1. | 0.25 | 1:20:30 | 2.2 | 7.8 | Do. |

EXAMPLES 38–49

A similar procedure to that employed in Example 29 was used except that the catalyst system used was titanium tetra n-butoxide, aluminium bromide and lithium butyl. The procedure for liquid monomers was as indicated in Examples 30–37.

| Example Number | Monomer | Ti(OⁿBu)₄ conc. mmole/ 500 ml. | Temp. ° C. | Ti:Al:Li molar | Yield g./500 ml./hr. | I.V. | Comments |
|---|---|---|---|---|---|---|---|
| 38 | Ethylene | 0.25 | 0 | 1:20:40 | 28 | 8.9 | Insoluble white crumb. |
| 39 | do | 0.25 | 20 | 1:20:40 | 54 | 8.1 | Do. |
| 40 | do | 0.25 | 40 | 1:20:40 | 69 | 8.6 | Do. |
| 41 | do | 0.125 | 40 | 1:20:40 | 60 | 8.8 | Do. |
| 42 | do | 0.0625 | 40 | 1:20:40 | 45 | 8.9 | Do. |
| 43 | do | 0.125 | 40 | 1:10:20 | 40 | 9.1 | Do. |
| 44 | Propylene | 0.25 | 5 | 1:20:40 | 3 | 10.1 | Soluble atactic. |
| 45 | do | 0.25 | 20 | 1:20:40 | 3.1 | 9.0 | Do. |
| 46 | do | 0.25 | 40 | 1:20:40 | 2.2 | 8.5 | Do. |
| 47 | Butene-1 | 0.25 | 20 | 1:20:40 | 3.0 | 8.0 | Do. |
| 48 | Heptene-1 | 0.25 | 20 | 1:20:40 | 5.0 | 8.5 | Do. |
| 49 | 4-methyl pentene-1. | 0.25 | 20 | 1:20:40 | 2.0 | 9.0 | Do. |

EXAMPLE 50

A similar procedure to that employed in Example 29 except that aluminium chloride was used in place of aluminium bromide. The chloride (0.25 mmole) was added as a well stirred slurry of finely powdered material in hexane as solvent.

The yield of polyethylene was 47 g. The product had an I.V. 10.8.

EXAMPLE 51

A similar procedure to that employed in Example 50 was used except that the transition metal component was tetra n-butyl titanate (0.25 mmole) in place of vanadyl tri n-butoxide.

The yield of polyethylene was 41 g. of I.V. 12.6.

EXAMPLE 52

A similar procedure to that employed in Example 29 was used except that zirconium tetra n-butoxide was used in place of vanadyl tri n-butoxide.

The yield of polyethylene was 20 g. I.V. 7.2.

What is claimed is:

1. A process for the polymerisation, at a temperature in the range from −30° C. to +150° C., of at least one α-olefin in the presence of catalytic proportions of a catalyst system comprising (a) a compound selected from the group comprising organic compounds of vanadium, titanium and zirconium not containing a halogen directly attached to the metal atom, (b) an aluminium compound selected from the group consisting of aluminium trihalides and aluminium dihalohydrides and (c) an organo-metallic compound of lithium selected from the group comprising lithium alkyls, aryls and aralkyls, the lithium component (c) only being brought into contact with the aluminium component (b) when component (a) or at least one hydrocarbon monomer is also present, and in which the molecular ratio of the aluminium component (b) to component (a) is in the range 8–50:1 and the molecular ratio of the aluminium component (b) to component (c) is within the range 0.25–5:1.

2. A process for the copolymerization, at a temperature in the range from −30° C. to +150° C., of ethylene with an α-olefin and, optionally, up to 10% of a third monomer, in the presence of catalytic proportions of a catalyst system comprising (a) a compound selected from the group comprising organic compounds of vanadium, titanium and zirconium not containing a halogen directly attached to the metal atom, (b) an aluminium compound selected from the group consisting of aluminium trihalides and aluminium dihalohydrides and (c) an organo-metallic compound of lithium selected from the group comprising lithium alkyls, aryls and aralkyls, the lithium component (c) only being brought into contact with the aluminium component (b) when component (a) or at least one of the hydrocarbon monomers is also present, and in which the molecular ratio of the aluminium component (b) to (a) is in the range 8–50:1 and the molecular ratio of the aluminium component (b) to component (c) is within the range 0.25–5:1.

3. A process according to claim 2 in which ethylene is copolymerized with a second α-olefin selected from the group comprising propylene, butene-1 and 4-methyl pentene-1.

4. A process for the copolymerization of ethylene with an α-olefin and up to 10% of a third monomer according to claim 2 in which the third monomer is selected from the group consisting of propylene, butene-1, 4-methyl pentene-1, dicyclopentadiene, cyclo-octadiene, hexadiene-1,4 and trivinylcyclohexane.

5. A process according to claim 2 in which polymerization is carried out at a temperature in the range from $-10°$ C. to $+60°$ C.

6. A process according to claim 2 in which polymerization is performed in a hydrocarbon solvent.

7. A process according to claim 6 in which the hydrocarbon solvent used is a mixture of straight chain paraffins selected from the group comprising hexane, heptane and octane and a cycloparaffin selected from the group comprising cyclohexane and methyl-cyclohexane.

8. A process for the homopolymerization, at a temperature in the range from $-30°$ C. to $+150°$ C., of α-olefins in the presence of catalytic proportions of a catalyst system comprising (a) a compound selected from the group comprising organic compounds of vanadium, titanium and zirconium not containing a halogen directly attached to the metal atom, (b) an aluminium compound selected from the group consisting of aluminium trihalides and aluminium dihalodydrides and (c) an organo-metallic compound of lithium selected from the group comprising lithium alkyls, aryls and aralkyls, the lithium component (c) only being brought into contact with the aluminium component (b) when component (a) or the α-olefin monomer is also present, and in which the molecular ratio of the aluminium component (b) to component (a) is in the range 8–50:1 and the molecular ratio of the aluminium component (b) to compound (c) is within the range 0.25–5:1.

9. A process according to claim 8 in which the α-olefin is selected from the group consisting of ethylene, propylene, butene-1, isobutene, heptene-1, 4-methyl pentene-1, 2-methyl pentene-1 and 2,4,4-trimethyl pentene-1.

10. A process according to claim 8 in which polymerization is carried out at a temperature in the range from $-10$ to $+60°$ C.

11. A catalyst system for the polymerization of at least one α-olefin comprising (a) a compound selected from the group comprising organic compounds of vanadium, titanium and zirconium not containing a halogen directly attached to the metal atoms, (b) an aluminium compound selected from the group consisting of aluminium trihalides and aluminium dihalohydrides and (c) an organo-metallic compound of lithium selected from the group comprising lithium alkyls, aryls and aralkyls, and in which the molecular ratio of the aluminium component (b) to component (a) is in the range 8–50:1 and the molecular ratio of the aluminium component (b) to component (c) is within the range 0.25–5:1.

12. A catalyst system according to claim 11 in which component (a) is selected from the group consisting of vanadyl di-isopropylsalicylate, tri-n-butyl vanadate, vanadyl acetyl-acetonate, triethyl vanadate, titanium butoxide and zirconium butoxide.

13. A catalyst system according to claim 11 in which component (b) is selected from the group comprising aluminium tri-iodide, aluminium tri-bromide and aluminium di-bromohydride.

14. A catalyst system according to claim 11 in which component (c) is selected from the group consisting of n-butyl lithium, benzyl lithium and phenyl lithium.

15. A catalyst system according to claim 11 in which the lithium component (c) is only brought into contact with the aluminium component (b) whene component (a) or a hydrocarbon monomer is also present.

References Cited

UNITED STATES PATENTS 3,299,025   1/1967   D'Alelio _____ 260—93.1

JOSEPH L. SCHOFER, Primary Examiner

R. S. BENJAMIN, Assistant Examiner

U.S. Cl. X.R.

260—88.2, 93.7, 94.9; 252—429, 431